Figure 1:
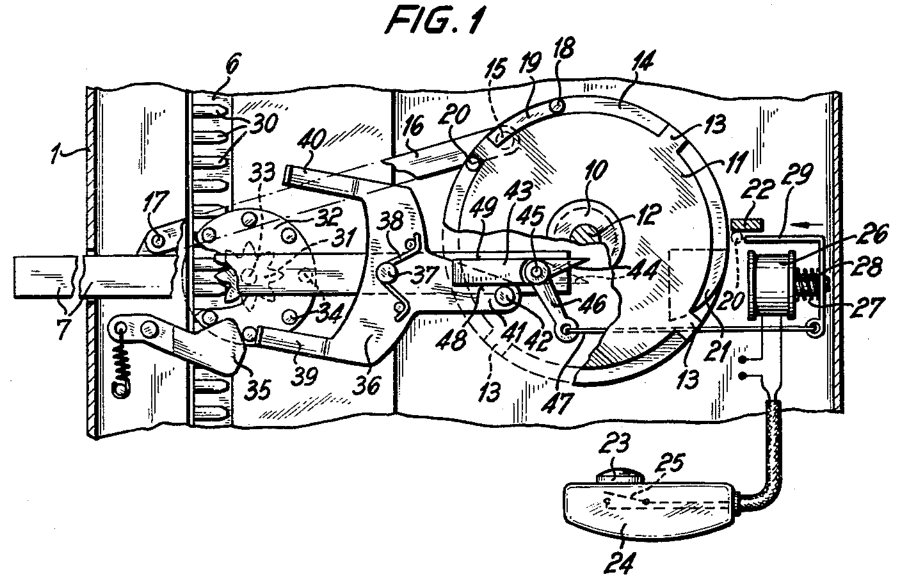

AUTOMATIC SLIDE PROJECTOR WITH REMOTE CONTROL FOR REVERSING TRAVEL DIRECTION OF MAGAZINE

Filed Nov. 19, 1962

3,165,971

AUTOMATIC SLIDE PROJECTOR WITH REMOTE CONTROL FOR REVERSING TRAVEL DIRECTION OF MAGAZINE

Erich Zillmer and Gerhard Brinkmann, Braunschweig, Germany, assignors to Voigtlander A.G., Braunschweig, Germany, a corporation of Germany Filed Nov. 19, 1962, Ser. No. 238,349
Claims priority, application Germany, Nov. 24, 1961, Z 9,094
12 Claims. (Cl. 88—28)

This invention relates to automatic slide projectors in which slides, mounted in a magazine, are sequentially projected responsive to operation of a remote control means. More particularly, the present invention is directed to a simplified remote control means for such an automatic slide projector, by means of which the direction of travel of the magazine may be readily reversed for re-projecting a previously projected slide.

In a known type of automatic slide projector, the slides are mounted in a magazine which is advanced longitudinally, in a stepwise manner, by operation of a remote control device. In the cycle of operation, a slide in the projection position is shifted back into the magazine, the magazine is advanced by one step, and the next slide is shifted out of the magazine to the projection position, the arrangement being cyclically repeated under the control of the remote control device.

In automatic slide projectors of this type, it is known to provide special control arrangements whereby, when desired, the direction of travel of the magazine may be reversed so that a previously projected slide may be re-projected. However, known arrangements of this type have been rather complicated in operation, particularly for an unskilled operator, and have been subject to ready derangement and malfunction.

The present invention is directed to an automatic slide projector of the aforementioned type in which there is provided an exceptionally simple control means operable, in one mode of operation, to advance the magazine in the normal step-by-step manner to successively project the slides, and further operable to reverse the direction of travel of the magazine at will, and responsive to different modes of operation of the same remote control device.

More particularly, the automatic slide projector of the invention is provided with a slide changer which is reciprocable transversely to the direction of travel of the magazine. This slide changer carries a shiftable drive member which is operable to actuate magazine driving means for selective stepping of the magazine in either direction, the drive member having a first drive position in which, during each reciprocation of the slide changer, the driving member, through suitable magazine stepping mechanism, advances the magazine one step in a forward direction. The drive member has a second position, to which it may be shifted at the will of the operator through the medium of the remote control, and in which position, during reciprocation of the slide changer, the drive member will effect movement of the magazine in the reverse direction. This selective shifting of the drive member or switching device to either of its drive positions is performed by the same remote control means which effects the normal step-by-step advance of the magazine and the successive projection of the slides mounted therein.

Figure 2:
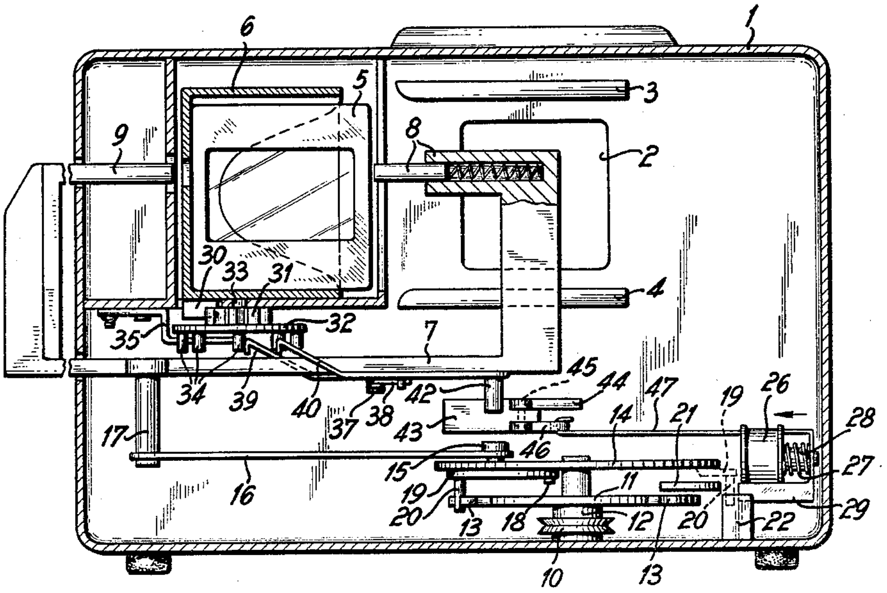

For an understanding of the principles of the invention, reference is made to the following description of a typical embodiment thereof as illustrated in the accompanying drawing. In the drawing:

FIG. 1 is a partial horizontal sectional view through an automatic slide projector embodying the invention, and illustrating the magazine stepping and slide shifting means embodying the invention; and FIG. 2 is a transverse vertical sectional view through the projector shown in FIG. 1.

Referring to the drawing, a projector housing 1 is illustrated as having a slide window 2 substantially centered transversely of the optical axis of the projector, and adjacent which are rails 3 and 4 for supporting a slide 5 displaced from magazine 6 into a position covering the window 2. Displacement of slides 5 from magazine 6, and return of the slides to the magazine, are effected by a known type of slide changer 7 which is reciprocable transversely of the optical axis of the projector. In the drawings, slide changer 7 is illustrated in the position in which its arm or slide engaging means 8 has returned a slide 5 to magazine 6, the slide 5 having been returned from the rails 3 and 4 adjacent the slide window 2. The slide changer has a second arm 9 which, upon movement of the slide changer 7 to the right, as viewed in the drawings, displaces a slide 5 from magazine 6 onto the support rails 3 and 4 for positioning the slide across the slide window 2.

The step-by-step advance of the magazine 6, and the reciprocation of the slide changer 7, may be effected by any suitable power means. For example, the usual driving motor for the ventilator for the projector may be utilized for the driving of the magazine and the reciprocation of the slide changer. The ventilator motor is generally provided with a pulley 10 for engaging driving means connecting the motor to the ventilator. As illustrated in the drawings, a cam plate 11 is fixedly secured to the pulley 10, the pulley 10 and the cam plate 11 being rotatable as a unit on a shaft 12 mounted in a suitable bearing in the housing 1. The ventilator motor, of course, operates continually whenever the projector is energized.

The periphery of cam plate 11 is formed with a number of radially projecting cam fingers 13. Rotatably mounted on the shaft 12, independently of cam plate 11 and pulley 10, is a substantially circular driving disk 14 of somewhat larger diameter than the main periphery of cam plate 11. Through the medium of a pin 15, disk 14 is connected to one end of a link or connecting rod 16 which, at its other end, is oscillatably connected to a pin 17 on the slide changer 7. Thereby, during each revolution of disk 14, a single shuttling movement or reciprocation of slide changer 7 is effected. In a manner to be described, disk 14 may be selectively coupled to cam plate 11 during a single rotation of cam plate 11.

Disk 14 carries a bearing 18 on which is pivotally mounted a coupling catch 19, coupling catch 19 being so connected to disk 14 that it resists displacement. Catch 19 carries a coupling pin 20 which is capable of being moved into the path of travel of the radial projections or cam fingers 13 of cam plate 11. By swinging movement of catch 19, the pin 20 may be moved either radially outwardly, or inwardly to the position illustrated in FIG. 1 of the drawing. A fixed cam 21, which is secured to housing 1, is disposed in the path of travel of pin 20, as is also a detent 22 fixed to housing 1. In the stop or rest position of disk 14, pin 20 engages detent 22, as indicated by the broken line illustration in FIGS. 1 and 2. In this position of pin 20, there is no coupling between cam plate 11 and disk 14, and it will be noted, from FIG. 1, that cam plate 11 and disk 14 are arranged to rotate in a counterclockwise direction.

Coupling of disk 14 to cam plate 11, by engagement of pin 20 with a radial cam finger 13 of cam plate 11, is effected by pressing a button 23 of a remote control switch unit 24, such pressing of button 23 closing a normally open switch 25. When switch 25 is closed, it energizes a solenoid 26 in the housing 1, solenoid 26 having associated therewith a spring 27 which normally biases an armature 28 outwardly away from solenoid 26. When solenoid 26 is energized, armature 28 is drawn into the solenoid and an arm 29 connected to the armature engages pin 20 to move the latter inwardly so that it will be in the path of travel of a finger 13 of cam 11. This couples disk 14 to cam plate 11 so that disk 14 is rotated counter counterclockwise through one revolution. Near the completion of this revolution, pin 20 engages fixed cam 21 and is displaced outwardly to disengage the finger 13 of cam plate 11, the rotational movement of cam 14 continuing until pin 20 engages detent 22. This stops rotation of disk 14.

The reciprocation of slide changer 7, by virtue of the rotation of disk 14 and through the medium of the link 16, not only effects shifting of a slide 5 out of magazine 6, into the projection position, and back to the magazine, but also effects an advance of magazine 6. This advance is effected during the motion of slide changer 7 to the left, as viewed in the drawing, wherein a slide 5 is removed from the rails 3 and 4 and restored to the magazine 6. In a known manner, magazine 6 is provided with a rack 30 which is engaged by a ratchet wheel 31 rotatably mounted on a shaft 33 secured to housing 1 on the center line of reciprocation of slide changer 7, the ratchet wheel 31 being secured to rotate with an indexing wheel 32. Indexing wheel 32 carries a number of pins 34 equal to the number of teeth of ratchet wheel 31. A spring biased detent 35 normally engages between adjacent teeth 35 so as to releasably maintain ratchet wheel 31 and indexing wheel 32 against rotation. In the position in which ratchet wheel 31 and indexing wheel 32 are held by detent 35, a slide 5 is properly aligned for engagement by fingers 8 and 9 of slide changer 7.

In accordance with the invention, a forked pawl 36 is oscillatably mounted on the slide changer 7, along the center line of reciprocation of the latter, as by being mounted on a pin 37 on the slide changer, and a spring 38 tends to bias pawl 36 to a position in which its forked arms 39 and 40 are parallel to the direction of reciprocation of the slide changer. Forked pawl 36 has a pilot or guide arm 41 carrying a pin 42 which, under the bias of spring 38, is normaly aligned with the center line of reciprocation of slide changer 7. It will be seen that the axis of turning which is provided for the pawl 36 by the pin 37 and the axis of turning which is provided for the wheels 31 and 32 by the shaft 33 are located in a plane which includes the center line of reciprocation of the slide changer 7.

A control arm or guide cam 43 is mounted in housing 1 within the range of travel of pilot pin 42 during reciprocation of slide changer 7. Guide cam 43 has a pilot nose 44, and carries a shaft 45 which also has secured thereto a radius arm 46 connected by a link 47 to the armature 28 of solenoid 26. When solenoid 26 is deenergized, pilot or guide nose 44 occupies the position shown in solid lines in FIG. 1 and, when solenoid 26 is energized, the pilot or guide nose 44 occupy the position shown in dotted lines in FIG. 1.

The illustrated arrangement, as thus far described, operates in the following manner. When slide changer 7 is moved to the right to shift a slide 5 out of magazine 6 and onto rails 3 and 4 adjacent slide window 2, the pilot pin 42 of the forked pawl 36 is substantially in the area immediately above the magnet 26. Pin 20 of disk 14 occupies a position engaging the detent 22, as illustrated in broken lines. To change the slide, solenoid 26 is momentarily energized by momentarily depressing push button 23 to close switch 25. Armature 28, and its extension 29, thereupon move pin 20 into the path of travel of projecting cam fingers 13 of cam plate 11. At the same time, pilot or guide nose 44 is oscillated from the solid line position to the dotted line position momentarily and only during energization of solenoid 26.

If solenoid 26 is energized for only a brief interval, the guide or pilot tongue 44 of guide cam 43 will have returned to its solid line position before pin 42 is moved to the left sufficiently far to engage pilot or guide finger or nose 44. Under these conditions, pin 42 is guided by nose 44 onto the edge 48 of guide cam 43. Forked pawl 36 is thereby oscillated clockwise to the position shown in FIG. 1 wherein arm 39 engages one of the pins 34 of indexing wheel 32. Upon continuation of the movement of slide changer 7 to the left to restore a slide 5 into the magazine 6, arm 39, overcoming the biasing force of the detent 35, moves indexing wheel 32 and ratchet 31 one step in a clockwise direction. This displaces magazine 6 in a forward direction by one step, the forward direction being toward the top of FIG. 1. Slide changer 7 then reverses its direction of movement to remove the next slide from magazine 6 onto rails 3 and 4 adjacent slide window 2.

When it is desired, during the changing of the slides, to move magazine 6 backward for the purpose of re-projecting a previously projected slide, all that is necessary is to maintain push button 23 depressed for a longer interval. Maintaining push button 23 depressed for such longer interval maintains solenoid 26 energized for a longer interval so that pilot nose 44 of guide cam 43 is maintained in the dotted line position for a longer interval. As a result, during movement of slide changer 7 to the left, pin 42, engaging pilot or guide nose 44, will be directed along the side 49 of guide cam 43. This will swing forked pawl 36 counterclockwise so that its arm 40 will engage a pin 34 of indexing wheel 33. Consequently, upon continued movement of slide changer 7 to the left, indexing wheel 32 and ratched wheel 31 will be rotated one step in a counterclockwise direction to move magazine 6 longitudinally one step in the reverse direction. Thereby, the slide 5 which has been previously projected may be re-projected, and the operation may be repeated for as many steps as desired by repeated longer duration pressings of the push button 23.

It will be noted from the foregoing that, merely by varying the operating time or mode of operation of the porting means for transporting the magazine 6 either in a vanced stepwise in a forward direction or may be stepped rearwardly to repeat a showing of a previously projected slide. Thus, the additional switching means previously required for effecting reverse motion of magazine 6 to re-project a slide is eliminated, and only a single and very simple remote control switch device 24 is needed to effect both normal operation of the automatic slide projector and reverse motion of the magazine 6.

It will be seen from the above description that the wheels 31 and 32 form together with the rack 30 a transporting means for transporting the magazine 6 either in a forward direction or in a reverse direction. The rotary disk 14 together with the pin 15, the link 16, the pin 17, and the slide changer 7 form a drive means which, once it is set into operation, continues to operate through a complete cycle during which this drive means moves from an initial rest position along a predetermined path to an end position distant from this rest position and back to the rest position to complete its cycle of operations. The pawl 36 forms a transmission means which is carried by the drive means for transmitting a drive therefrom to the wheels 31 and 32 so as to actuate the rack 30 for advancing the magazine 6 in the forward or the reverse direction. The transmission means 36 of course has one position where the magazine will be advanced in a forward direction and a second position where the magazine will be advanced in a reverse direction, and the element 44 together with the cam 43 form a deflecting means capable of deflecting the transmission means 36 into one or the other of its positions, this deflecting means 43, 44 being situated along the path of movement of the transmission means 36 with the drive means once the latter starts to move after a cycle of operations thereof has been initiated, so that in accordance with the position of the deflecting means the transmission means 36 will be given a position which will control the direction of movement of the magazine. The solenoid 26 together with the manually operable assembly 24 form a manually operable means cooperating with the drive means for initiating a cycle of operations thereof and also cooperating with the deflecting means for moving the later simultaneously with the initiation of the operation of the drive means from a rest position where the transmission means will provide a forward direction of movements of the magazine to a second position where the deflecting means will deflect the transmission means to a position which will produce reverse movement of the magazine, and the movement of the transmission means 36 into engagement with the deflecting means requiring a length of time which gives the operator the option of retaining the deflecting means in its second position or releasing the manually operable means so that the deflecting means will return to its rest position before the transmission means reaches the deflecting means, and in this way the operator has the option of providing either forward or reverse movement of the magazine. It is particularly to be noted that irrespective of the choice which is made by the operator in this way, at the end of a cycle of operations all of the parts return to their initial position so that the choice of the direction in which the magazine is to be moved must be made by the operator at each operating cycle, and the structure will not operate to retain a direction of movement which is instituted by the operator during one cycle throughout successive cycles until again changed by the operator. Moreover, it is to be noted, as is clearly apparent from FIG. 1, that the distance between the indexing wheel 32 and the deflecting means 44 is such that one or the other of the arms 39 and 40 of the pawl 36 will engage a pin 34 of the indexing wheel 32 almost immediately after the deflecting nose 44 engages the pin 42 for deflecting the pawl 36 in one direction or the other, so that the operator can observe the direction of movement of the magazine and will not maintain the solenoid 26 energized for an undesirably long time after the pawl 36 has been deflected in one direction or the other.

While a specific embodiment of the invention has been shown and described in detail to illustrate the application of the principles of the invention, it will be understood that the invention may be embodied otherwise without departing from such principles.

What is claimed is:

1. A slide projector comprising, in combination, a housing having a slide window substantially centered transversely of the optical axis of the projector, and slide support means adjacent said window; a slide magazine movable substantially parallel to said optical axis; a slide changer reciprocable transversely of said optical axis to transfer slides between said magazine and said support means; driving means, including means coupled to said slide changer, operable, when activated, to reciprocate said slide changer through a slide changing cycle; a single control means selectively operable to activate said driving means; magazine stepping mechanism, including a shiftable drive member reciprocable with said slide changer, operable, during each slide changing cycle, to step said magazine; said drive member, in a first position, stepping said magazine in one direction and, in a second position, stepping said magazine in the opposite direction; and shifting means operable, responsive to one mode of operation of said single control means, to shift said drive member to said first position and, responsive to another mode of operation of said single control means, to shift said drive member to said second position, said stepping mechanism including a ratchet wheel cooperable with said magazine and rotatably mounted on an axis situated in a plane which includes the centerline of reciprocation of said slide changer; said shiftable drive member comprising a forked pawl oscillatably mounted on said slide shifter at substantially the center line of reciprocation thereof, the arms of said forked pawl being normally spaced uniformly to either side of such center line; said drive member, when shifted to said first position, having a first arm positioned to cooperate with said ratchet wheel to turn the same in one direction and, when shifted to said second position, having a second arm cooperable with said ratchet wheel to turn the same in the opposite direction, means biasing said forked pawl to a position in which its forked arms extend in substantially parallel uniformly spaced relation to either side of the line of reciprocation of said slide changer, said forked pawl including a guide arm projecting radially from its center of oscillation in a direction opposite to the projection direction of its forked arms; said shifting means including a switching cam positioned in the path of movement of said guide arm during reciprocation of said slide changer and operable to shift said forked pawl to either said first position or said second position dependent upon the mode of operation of said single control means.

2. A slide projector comprising, in combination, a housing having a slide window substantially centered transversely of the optical axis of the projector, and slide support means adjacent said window; a slide magazine movable substantially parallel to said optical axis; a slide changer reciprocable transversely of said optical axis to transfer slides between said magazine and said support means; driving means, including means coupled to said slide changer, operable, when activated, to reciprocate said slide changer through a slide changing cycle; a single control means selectively operable to activate said driving means; magazine stepping mechanism, including a shiftable drive member reciprocable with said slide changer, operable, during each slide changing cycle, to step said magazine; said drive member, in a first position, stepping said magazine in one direction and, in a second position, stepping said magazine in the opposite direction; and shifting means operable, responsive to one mode of operation of said single control means, to shift said drive member to said first position and, responsive to another mode of operation of said single control means, to shift said drive member to said second position, said driving means including a substantially circular cam plate continuously rotated during energization of said projector, said plate having radially projecting cam fingers; a rotatable disk coaxial with said cam plate and rotatable independently of the latter; means connecting said disk to said slide changer to reciprocate said slide changer through one cycle during each rotation of said disk; a pin carried by said disk and movable into and out of the path of travel of said projecting cam fingers; fixed cam means operable, at the end of each rotation of said disk, to move said pin out of the path of travel of said cam fingers; a fixed stop engageable with said pin upon movement of the latter out of such path of travel; said control means, when operated, displacing said pin out of engagement with said fixed stop and into the path of travel of said projecting cam fingers.

3. A slide projector, as claimed in claim 2, said control means including a solenoid; a normally open switch in the energizing circuit of said solenoid; an armature for said solenoid carrying an operator aligned with said pin when said pin is engaged with said detent; means biasing said armature to a position in which said operator is disengaged from said pin; said solenoid, upon closure of said normally open switch, moving said armature to a position in which said operator engages said pin and moves the latter into the path of travel of said cam fingers.

4. A slide projector, as claimed in claim 3, in which said drive member shifting means comprises a switching cam oscillatably mounted about an axis situated in a plane which includes the center line of reciprocation of said slide changer; means connecting said switching cam to said armature whereby, in the retracted position of said armature, said switching cam is positioned to shift said drive member to said first position and, when said solenoid is energized, said switching cam is positioned to shift said drive member to said second position.

5. A slide projector, as claimed in claim 4, in which said magazine stepping means comprises a ratchet wheel rotatable about an axis substantially on the center line of reciprocation of said slide changer; said shiftable drive member comprising a forked pawl oscillatably mounted on said slide changer at substantially the longitudinal center line of its reciprocation and having a pair of forked arms which are substantially parallel and which are selectively cooperable with said ratchet wheel to rotate the latter in either direction depending upon the position of said forked pawl; said forked pawl having a guide nose extending from its center of oscillation in a direction opposite to its forked arms; said shifting means including a switching cam oscillatably mounted in said housing in the path of movement of said forked pawl; said guide nose having a pin engageable with said shifting cam; said shifting cam being disposed intermediate the limits of movement of said pin during reciprocation of said slide changer.

6. A slide projector, as claimed in claim 5, said pin, at the limit of movement of said slide changer in the direction moving a slide onto said support means, being disposed at a substantial distance from said switch cam; said switch cam, when said solenoid is deenergized, occupying a position in which, upon engagement thereof by said pin, said forked pawl will be shifted to said first position in which it rotates said ratchet wheel, in a direction to advance said slide and, during energization of said solenoid, being shifted to a position in which, upon engagement thereof by said pin, said forked pawl is shifted to said second position in which it rotates said ratchet wheel to move said magazine in a retracting direction; the distance of said switch cam from said pin, when said slide changer is at the limit of movement in the direction moving a slide onto said support means, being such that, upon momentary energization of said solenoid, said switch cam is first moved to said second-mentioned position thereof and then returned to said first-mentioned position thereof before engagement of said switch cam by said pin; said switch cam, upon sustained energization of said solenoid during travel of said slide changer in a direction to transfer a slide to the magazine, remaining in said second-mentioned position thereof so that, upon such sustained energization of said solenoid, said forked pawl will be shifted to a position in which it moves said magazine in the reverse direction.

7. A slide projector, as claimed in claim 6, in which said switching cam comprises a member having a pair of parallel side edges substantially parallel to the direction of reciprocation of said slide changer, the portion of said switching cam having said side edges extending from the pivot point of said switching cam toward said magazine; said switching cam having a portion projecting from its pivot point in a direction away from said magazine and formed as a tapered nose for engagement with said pin.

8. In a slide projector, support means for supporting a magazine for forward or reverse movement, transporting means carried by said support means for transporting a magazine either in a forward or reverse direction, drive means having a rest position and moving automatically through the complete cycle of operations along the given path from said rest position to an end position and back to said rest position once a cycle of operations of said drive means has been initiated, transmission means carried by said drive means for movement therewith along said path and having one position in which said transmission means cooperates with said transporting means to move said magazine forwardly and said transmission means having a second position where it cooperates with said transporting means for actuating the latter to move said magazine in a reverse direction, deflecting means situated in the path of movement of said transmission means when the latter moves with said drive means after a cycle of operations of said drive means has been initiated, said deflecting means having a rest position where it cooperates with said transmission means to maintain the latter in said one position thereof for providing forward movement of said magazine and said deflecting means having a second position where it is situated in the path of movement of said transmission means to deflect the latter into its second position for providing movement of said magazine in said reverse direction, and manually operable means cooperating with said drive means for initiating a cycle of operations thereof and also cooperating with said deflecting means for displacing the latter from said rest position thereof to said second position thereof, said deflecting means automatically returning to its rest position when the operator releases said manually operable means and the time required for said transmission means to move into engagement with said deflecting means being sufficiently great to permit the operator to release said manually operable means before said transmission means reaches said deflecting means so as to provide forward movement of the magazine or to retain said manually operable means active until after said deflecting means is engaged by said transmission means so that said deflecting means will in this way be maintained in its second position deflecting said transmission means to its second position providing reverse movement of the magazine.

9. In a slide changer as recited in claim 8, the distance between said deflecting means and transporting means being small enough to provide actuation of said transporting means by said transmission means almost immediately after said transmission means has been engaged by said deflecting means.

10. In a slide changer as recited in claim 8, biasing means operatively connected to said transmission means for releasably holding the latter in a neutral position between said one and said second positions thereof and said deflecting means deflecting said transmission means from said neutral position either into said one position of said transmission means or into said second position thereof depending upon whether the operator has released said manually operable means before said transmission means has reached said deflecting means, said biasing means returning said transmission means to said neutral position thereof at the end of each cycle of operations of said drive means.

11. In a slide changer as recited in claim 8, said drive means forming part of a slide changer for moving a slide away from and back to the magazine.

12. In a slide changer as recited in claim 8, said manually operable means including a single solenoid whose armature is displaced upon actuation of said manually operable means and transmission elements operatively connected to said armature to be moved thereby for initiating the operating cycle of said drive means and for moving said deflecting means from said rest position thereof to said second position thereof as long as the operator actuates said manually operable means.

References Cited by the Examiner

UNITED STATES PATENTS

| | | | |
|---|---|---|---|
| 3,059,360 | 10/62 | Krauskopf | 88—28 X |
| 3,072,016 | 1/63 | McCammon | 88—28 |

OTHER REFERENCES

German application No. 1,106,520, May 10, 1961.

NORTON ANSHER, *Primary Examiner.*

WILLIAM MISIEK, *Examiner.*